US008900713B2

(12) United States Patent
Roquiny

(10) Patent No.: US 8,900,713 B2
(45) Date of Patent: Dec. 2, 2014

(54) SOLAR CONTROL GLAZING

(75) Inventor: Philippe Roquiny, Jumet (BE)

(73) Assignee: AGC Glass Europe, Brussels (BE)

( * ) Notice: Subject to any disclaimer, the term of this patent is extended or adjusted under 35 U.S.C. 154(b) by 1187 days.

(21) Appl. No.: 12/428,708

(22) Filed: Apr. 23, 2009

(65) Prior Publication Data

US 2009/0274901 A1 Nov. 5, 2009

(30) Foreign Application Priority Data

Apr. 30, 2008 (EP) .................................... 08103794

(51) Int. Cl.
*C03C 17/36* (2006.01)
(52) U.S. Cl.
CPC ............. *C03C 17/36* (2013.01); *C03C 17/3626* (2013.01); *C03C 17/3644* (2013.01); *C03C 17/3652* (2013.01); *C03C 17/3618* (2013.01); *C03C 17/3647* (2013.01); *C03C 17/3639* (2013.01); *C03C 17/366* (2013.01)
USPC ............ 428/433; 428/426; 428/432; 428/434
(58) Field of Classification Search
USPC ................................... 428/426, 433, 434, 432
See application file for complete search history.

(56) References Cited

U.S. PATENT DOCUMENTS

| 3,978,272 | A |   | 8/1976  | Donley |
|---|---|---|---|---|
| 5,876,854 | A | * | 3/1999  | Kawazu et al. ............... 428/428 |
| 5,942,338 | A |   | 8/1999  | Arbab et al. |
| 6,436,541 | B1 | * | 8/2002  | Sopko et al. ................... 428/432 |
| 7,736,746 | B2 | * | 6/2010  | Roquiny et al. ............... 428/432 |
| 2006/0029754 | A1 |   | 2/2006  | Medwick et al. |
| 2006/0210809 | A1 |   | 9/2006  | Finley et al. |
| 2008/0187692 | A1 |   | 8/2008  | Roquiny et al. |
| 2008/0311389 | A1 |   | 12/2008 | Roquiny et al. |

FOREIGN PATENT DOCUMENTS

| WO | WO2006048463 | * | 5/2006 |
|---|---|---|---|
| WO | WO2006122900 |   | 11/2006 |

OTHER PUBLICATIONS

U.S. Appl. No. 11/577,925, filed Apr. 25, 2007, Roquiny, et al.
Ashmore, et al., "Electrical and Structural Characteristics of Non-Stoichiometric Cu-based Delafossites"; Journal of Materials Science 40 (2005); pp. 3891-3896.
International Search Report issued in PCT/EP2009/054778 on Nov. 5, 2009.

* cited by examiner

*Primary Examiner* — Callie Shosho
*Assistant Examiner* — Nicholas Kokkinos
(74) *Attorney, Agent, or Firm* — Oblon, Spivak, McClelland, Maier & Neustadt, L.L.P.

(57) ABSTRACT

A sheet of vitreous material bearing a multilayer solar control lamination that includes at least one functional layer based on a material that reflects infrared radiation surrounded by dielectric coatings and at least one 4 nm thick absorbent layer formed by at least one oxide or oxynitride of a cobalt- and/or copper-based alloy. The sheet of vitreous material may be applied to solar control glazing units having multiple glazings.

23 Claims, No Drawings

SOLAR CONTROL GLAZING

This application claims priority to European Patent Application No. 08 103 794.7, filed Apr. 30, 2008, incorporated herein by reference.

The present invention relates to a sheet of vitreous material bearing a multilayer solar control lamination and also a multiple glazing unit incorporating at least one such sheet of vitreous material bearing a solar control lamination.

The solar control lamination structures, also called sunshield laminations, concerned in the present invention comprise at least one infrared reflective functional layer such as a silver-based layer, which is joined to anti-reflective dielectric coatings that also serve as attachment and protection coatings for the functional layer. There can be one, two or even three functional layers, each separated by at least one dielectric coating and each functional layer being surrounded by dielectric coatings. These different layers are deposited, for example, by magnetic field-assisted low-pressure cathodic sputtering using a well known magnetron type device. However, the present invention is not restricted to this particular deposition process.

These solar control laminations are used in the production of solar protection, or sunshield, glazing units in order to reduce the risk of excessive overheating, for example, of an enclosed space having large glazed surfaces as a result of insolation, and thus to reduce the power to be expended for air-conditioning in summer.

In this case, the glazing must allow the least possible amount of total solar energy radiation to pass through, i.e. it must have a relatively low solar factor (SF or g). However, it is highly desirable that it guarantees a certain level of light transmission ($L_T$) in order to provide a sufficient level of illumination inside the building. These somewhat conflicting requirements express the requirement to obtain a glazing unit with an elevated selectivity (S), defined by the ratio of light transmission to solar factor. These solar control laminations also have a low emissivity, which allows a reduction in the heat loss through high wavelength infrared radiation. Thus, they improve the thermal insulation of large glazed surfaces and reduce energy losses and heating costs in cold periods. The light transmission ($L_T$) is the percentage of incident light flux, of illuminant D65, transmitted by the glazing. The solar factor (SF or g) is the percentage of incident energy radiation, which, on the one hand, is directly transmitted by the glazing and, on the other hand, is absorbed by this and then radiated in the opposite direction to the energy source in relation to the glazing.

These sunshield glazing units are generally assembled as double glazing units, in which the glass sheet bearing the lamination structure is joined to another glass sheet, with or without a coating, with the multilayer solar control lamination structure in contact with the inside space between the two glass sheets.

In some cases, it is often necessary to conduct a mechanical strengthening operation on the glazing such as a thermal toughening or tempering of the glass sheet or sheets in order to improve its resistance to mechanical stresses. It may also be expedient to provide the glass sheets with a more or less complex curvature for particular applications by means of a bending operation at elevated temperature. In the production and shaping processes of the glazing units there are some advantages in conducting these thermal treatments on the already coated substrate instead of coating a substrate that has already been treated. These operations are conducted at a relatively high temperature, i.e. a temperature at which the, for example, silver-based infrared reflecting layer tends to deteriorate and lose its optical properties and its properties with respect to infrared radiation. In the case where the coated glass sheet has to undergo a thermal treatment, therefore, quite specific precautions must be taken to form a lamination structure that is able to undergo a thermal toughening or bending treatment, often referred to below by the expression "toughenable", without losing its optical and/or energy-related properties, for which it is formed.

It is also desirable that the glazing units meet certain aesthetic criteria in terms of light reflection ($L_R$), i.e. the percentage of incident light flux—of illuminant D65—reflected by the glazing, and reflected and transmitted colour. Market demand is for a glazing with low light reflection. The combination of a high selectivity with a low light reflection sometimes results in the formation of purple tints in reflection, which have very little aesthetic appeal.

To reduce the amount of heat that penetrates into the area through the glazing, the invisible infrared heat radiation is prevented from passing through the glazing by reflecting it. This is the role of the functional layer or layers based on a material that reflects infrared radiation. This is an essential element in a solar control lamination. However, a significant portion of the heat radiation is also transmitted by visible radiation. To reduce the transmission of this portion of the heat radiation and go beyond eliminating the supply of energy by infrared radiation, it is necessary to reduce the level of light transmission.

Patent Application FR 2 751 666 A1 proposes the insertion of a stainless steel oxide absorbent layer into the lamination to reduce the level of total energy transmission through the glazing. This solution provides a glazing that has good sunshield qualities in association with an aesthetically appealing tint. However, the absorption level provided by the stainless steel oxide is relatively low, particularly when the lamination has to undergo a toughening and/or bending thermal treatment of the glass substrate.

Patent application WO 02/48065 A1 proposes to insert an absorbent layer of TiN into the lamination. One of the problems with this solution is that the TiN absorbent layer oxidises in certain conditions, in particular during thermal treatment, to form $TiO_2$, which is transparent, thus losing part of its reason for being in the lamination. Moreover, the level of oxidation of the absorbent layer will depend on the thermal treatment conditions, which means that it will be difficult to determine the properties of the lamination after toughening.

Patent application WO 2005/012200 A1 proposes to insert an absorbent metal such as titanium into the lamination, e.g. under the silver. This results in a high-performance glazing with a low solar factor. However, once again, titanium oxidises during a high-temperature thermal treatment and loses its absorbent properties, and therefore it is difficult to easily obtain a glazing with a low solar factor on this basis when the lamination must undergo a toughening and/or bending thermal treatment.

The invention relates to a sheet of vitreous material bearing a multilayer solar control lamination comprising at least one functional layer based on a material that reflects infrared radiation surrounded by dielectric coatings, characterised in that the lamination comprises at least one absorbent layer with a thickness of at least 4 nm formed by at least one oxide or oxynitride of an alloy based on at least 20 atom % cobalt and/or copper.

The term "absorbent layer" is understood to mean a layer that absorbs a portion of the visible radiation and that comprises a material, which has a spectral absorption index $k(\lambda)$ of at least 0.05 on average in the wavelength range of 380-750 nm, the average being calculated on the basis of a value every 10 nm.

We have found that the use according to the invention of an absorbent layer of a sufficient thickness formed by at least one oxide of an alloy based on cobalt and/or copper allows glazing units with a solar control lamination having a very low solar factor, a low light reflection and an appealing reflected tint to be readily and easily formed, and that with a wise choice of alloy, the lamination retains its absorbent properties, even when subjected to a high-temperature thermal treatment such as toughening and/or bending.

When an absorbent material is introduced, the absorption is generally more intense over a part of the visible spectrum, which gives a specific colour to the lamination. The problem is to obtain an acceptable colour both in transmission and in reflection. We have found that, irrespective of whether the lamination must undergo a high-temperature thermal treatment or not, the invention allows laminations to be obtained that have an aesthetically appealing tint and comply with market demand.

This result is surprising, since copper oxide gives a brown tint that has little appeal and is not appreciated by the glazing market, and the fact that cobalt is ferromagnetic poses technical problems with respect to its deposition by reduced-pressure cathodic sputtering in a magnetron-type device.

The oxides or oxynitrides of these alloys of copper and/or cobalt in the absorbent layer are obtained by cathodic sputtering in an oxidising reactive atmosphere, possibly containing nitrogen, from a metal target made of the alloy in question. The oxides of these alloys can also be obtained by cathodic sputtering from ceramic targets of the oxides of these alloys. The use of oxide ceramic targets in particular facilitates the formation of a lamination with optical properties that are not spoiled by the high-temperature thermal treatment, so that a toughened coated glazing can be set side by side on the facade of a building with a non-toughened coated glazing, in which the coating lamination has the same structure, without there being any significant visual difference for an informed observer.

It is preferred that when the multilayer solar protection lamination is deposited onto an ordinary clear soda-lime float glass sheet 6 mm thick, the solar factor SF of the coated sheet is less than 45% and the light transmission $L_T$ is less than 70%. It is thus possible to obtain an effective solar shield.

The ferromagnetic state of pure cobalt makes it very difficult to use in a magnetron device. However, it has been found that its alloy with another metal allows this problem to be resolved much more easily. Different cobalt-based alloys with a non-ferromagnetic metal can be used, e.g. an alloy with about 33 atom % of Ti and about 66 atom % of Co to form $Co_2TiOx$ from a metal cathode of the alloy sputtered in an oxidising atmosphere. It is also possible to use a ceramic target of the mixed oxide of the alloy sputtered in a neutral or lightly oxidising atmosphere or an atmosphere containing a little nitrogen. According to the invention, oxide of an alloy is also understood to mean that the oxide can be a mixed oxide formed by co-sputtering from two ceramic targets respectively formed from oxides of the components of the alloy, e.g. oxides of Co and Ti.

Cobalt and/or copper alloy is understood to mean a material that contains one or more elements other than cobalt or copper, but wherein the cobalt or copper is present at a level of at least 20 atom %. The cobalt or copper is preferably present in the material in a higher proportion or in an equal proportion to another element.

The alloy preferably contains at least 40 atom %, advantageously at least 50 atom %, of cobalt or copper.

The absorbent layer is preferably formed by at least one oxide or oxynitride of the following alloys: cobalt-tin, cobalt-titanium, copper-aluminium, cobalt-chromium, copper-zinc, copper-tin, copper-cobalt, copper-titanium or cobalt-copper or mixtures thereof. It has been found that these alloys gave the best results both with respect to absorption stability and as regards the tint presented by the lamination. It is understood that the absorbent layer can be formed not only by cathodic sputtering of a metal target of one of these alloys in an oxidising atmosphere, but also from a ceramic target formed from mixed oxides of the components of the alloy or by co-sputtering separate targets of oxides of the components of the alloy in a neutral or slightly oxidised atmosphere or in the presence of a little nitrogen.

According to a first embodiment of the invention, the absorbent layer is preferably based on one or more of the following oxides: $CuAlOx$, $CuZnOx$, $CoSnOx$, $CoTiOx$, $CuTiOx$ or $CuSnOx$. It has been found that these oxides retain a high degree of absorption after thermal treatment of the lamination that contains them without any adverse effect on the "haze" value of the lamination, thus providing a particularly effective solar control lamination. The "haze" value is defined as being the ratio of the diffuse light transmission to the total light transmission multiplied by 100 to obtain a percentage. This value is measured according to ASTM standard D1003. Moreover, these oxides provide a grey, bluish grey, tint essentially in reflection on the vitreous material side that gives an aesthetically pleasing and acceptable visual appearance to the solar control lamination that meets the requirement of the market. Of these oxides, $CuAlOx$ and $CuZnOx$ are especially advantageous, since the sputtering target of metal alloy for their production in an oxidising reactive atmosphere in a magnetron is easy to obtain and can be readily used for large-scale commercial series production. The oxide $CuAlOx$ is particularly advantageous, since in particular it allows thermally treated glazing units that have a high absorption level and an aesthetically pleasing tint without haze to be easily obtained.

Of the oxides cited above, it has been found that oxides $CuAlOx$, $CoSnOx$, $CoTiOx$ or $CuSnOx$ are also suitable for solar control laminations that do not have to undergo high-temperature thermal treatment. Without thermal treatment, they provide a high absorption level that allows an effective solar control lamination to be obtained and they provide the lamination with an aesthetically pleasing visual appearance. Once again, $CuAlOx$ is of particular interest in this case because it is easy to obtain a suitable target for large-scale commercial production.

According to a second embodiment of the invention, the absorbent layer is preferably based on one or more of the following oxides: $CoCuOx$, $CoCrOx$ or $CoCrTiOx$. It has been found that these oxides were extremely advantageous with respect to absorption and the visual appearance of the laminations containing them when these have not to undergo high-temperature thermal treatment.

Preferably, according to one embodiment or the other of the invention, the absorbent layer has a thickness of at least 10 nm, advantageously in the range between 10 and 80 nm. This thickness range is sufficient to form an effective absorbent layer that nevertheless retains sufficient natural light to illuminate the interior of the building.

The functional layer can contain silver, copper, gold, palladium or aluminium, or a mixture or alloy thereof.

The functional layer is preferably silver-based. This is a particularly effective noble metal for reflecting infrared radiation. It is easily used in a magnetron device and its cost price is not prohibitive, particularly considering its efficacy. The silver can be doped with palladium or copper, for example, to a rate of 1 to 10%, for example, or a silver alloy can be used.

In some configurations, the lamination comprises at least two silver-based functional layers, and three silver-based layers, for example. By suitably adjusting the interference play of the dielectric layers, it is thus possible to achieve a high level of reflection of infrared radiation while retaining a relatively high light transmission.

The invention is most particularly suitable for laminations that must undergo a toughening and/or bending type of high-temperature thermal treatment. It has been found that some oxides or oxynitrides of cobalt and/or copper alloy provide a high level of absorption and surprisingly retain this high level of absorption after the high-temperature thermal treatment, and that, moreover, it provides the lamination with an appealing tint in reflection and transmission that complies with market demand. This is particularly the case with oxides of copper-aluminium, copper-zinc, copper-tin, cobalt-tin and cobalt-titanium alloys or mixtures thereof.

However, these oxides obviously also provide a high level of absorption in the lamination before thermal treatment.

Since some of these oxides provide the lamination with an advantageous tint, it has been found that the invention is also highly suitable for non-toughenable laminations. In this case, it would be preferred to use oxides of copper-aluminium, copper-tin, copper-cobalt, cobalt-titanium, cobalt-copper, cobalt-tin and cobalt-chromium alloy or mixtures thereof, and in particular the oxynitride of cobalt-chromium-titanium alloy.

Transparent dielectric coatings are well known in the field of layers deposited by cathodic sputtering. There are numerous suitable materials and it is not expedient to list them here. In general, these are metal oxides, oxynitrides or nitrides. Of those most commonly used, $SiO_2$, $TiO_2$, $SnO_2$, $ZnO$, $ZnAlOx$, $Si_3N_4$, $AlN$, $Al_2O_3$, $ZrO_2$, $Nb_2O_5$, $TiZrYOx$, $TiNbOx$ and $Bi_2O_3$ can be mentioned by way of example. With respect to the outer coating, $SnO_2$ is a dielectric material that is particularly well suited when the lamination does not have to undergo high-temperature thermal treatment.

At least one of the dielectric coatings preferably comprises at least one zinc-tin mixed oxide-based layer containing at least 20% tin. This oxide is highly suitable as dielectric coating to protect the absorbent layer, in particular in the case of thermal treatment of the lamination.

The lower dielectric coating arranged between the sheet of vitreous material and the functional layer preferably comprises at least one zinc-tin mixed oxide containing at least 20% tin, and the outer dielectric coating also comprises at least one zinc-tin mixed oxide containing at least 20% tin. This arrangement is very advantageous for protecting the absorbent layer both with respect to oxidation from the outside and from oxygen coming from the vitreous material.

The dielectric coating arranged below the or each functional layer preferably comprises a zinc oxide-based layer, possibly doped with aluminium, in direct contact with the functional layer or layers. Zinc oxide has a particularly favourable effect on the stability and corrosion resistance of the functional layer, in particular when silver is concerned. Zinc oxide is also advantageous with respect to the decomposition resistance of the functional layer, particularly when it is silver based, during high-temperature thermal treatment of the lamination. In the event of a thermal treatment, it is also advantageous for improving the electrical conductivity of a silver-based layer, and therefore for achieving a low emissivity.

Advantageously, the dielectric coating arranged below the or each functional layer comprises a zinc-tin mixed oxide-based layer that does not contain more than about 20% tin and at least about 80% zinc, preferably not more than about 10% tin and at least about 90% zinc, in direct contact with the functional layer or layers. This mixed oxide with a high zinc oxide content below and in direct contact with the functional layer, particularly when it is silver-based, is particularly advantageous for the resistance of the functional layer to the toughening and/or bending type high-temperature thermal treatment. The combination of this mixed oxide with a high zinc content below the functional layer with a zinc-tin mixed oxide containing at least 20% tin in the lower and outer dielectric layers represents the most advantageous structure for favourable resistance of the lamination during a high-temperature thermal treatment.

The solar control lamination preferably has a neutral tint when examined in reflection on the vitreous material side, i.e. when values for a* and b* (CIELAB 1976 L*a*b* values) are such that $-8<a^*<2$ and $-18<b^*<0$, preferably $-5<a^*<0$ and $-15<b^*<0$, and advantageously $-3<a^*<0$ and $-12<b^*<-2$. This neutral tint is advantageously slightly bluish. The lamination is thus highly appealing aesthetically and complies with market demand.

The invention extends to a multiple glazing unit comprising at least one sheet of vitreous material, on which is formed a lamination such as defined above. The invention provides a very useful sunshield multiple glazing.

The multiple glazing according to the invention preferably has a solar factor equal to or less than 35%, equal to or less than 28% and advantageously equal to or less than 22%, and a light reflection less than 18%. As a result, a particularly effective sunshield multiple glazing is obtained that does not generate glare when observed from outside the building where it is installed.

The multiple glazing according to the invention preferably has a light transmission less than 55% and preferably less than 42%. This allows the total energy transmission through the glazing to be greatly reduced.

The invention shall now be described in more detail in a non-restrictive manner on the basis of the following preferred exemplary embodiments.

EXAMPLES

Example 1

A 2 m by 1 m, 6 mm thick sheet of ordinary clear soda-lime float glass is placed in a magnetron-type magnetic field-assisted cathodic sputtering device at reduced pressure (about 0.3 Pa). A multilayer solar control lamination is deposited on this glass sheet comprising, in sequence:

a) a lower dielectric coating formed from two oxide layers deposited in a reactive atmosphere formed from a mixture of argon and oxygen from zinc-tin alloy cathodes of different compositions. The first zinc-tin mixed oxide with a thickness of about 30 nm is formed from cathodes of a zinc-tin alloy with 52% by weight of zinc and 48% by weight of tin to form the spinel structure of zinc stannate $Zn_2SnO_4$. The second zinc-tin mixed oxide $ZnSnO_x$ with a thickness of about 7 nm is deposited from targets of a zinc-tin alloy with 90% by weight of zinc and 10% by weight of tin.

b) An infrared reflecting functional layer formed from about 20 nm of silver from a target of practically pure silver in a neutral atmosphere of argon.

c) A double sacrificial metal layer formed from a first layer of NiCr with a thickness of 1 nm deposited from a target of an alloy with 80% Ni and 20% Cr, and a second layer of Ti with a thickness of 2.5 nm deposited from a titanium target. These layers are both deposited in a flux of argon lightly contaminated with oxygen from adjacent chambers. It should be noted that the oxidising atmosphere of the plasma during deposition of the following layer, described below, completely oxidises the layer of titanium so that at the end of the deposition process of the second dielectric the titanium is oxidised to form a compact layer of $TiO_2$. As a variant, it is also possible to deposit the layer in the form of partially oxidised TiOx. This layer can also be deposited, for example, from a TiOx ceramic target and oxidised by the plasma used for deposition of the following layer.

d) An absorbent layer comprising 15 nm of CoTiOx formed from a metal target of an alloy of 66 atom % of Co, the rest being Ti. As a variant, this absorbent layer can be deposited from a ceramic target formed from mixed oxide in the same relative proportions of the metals Ti and Co.

e) An outer dielectric coating formed from two layers of zinc-tin mixed oxides deposited in a reactive atmosphere formed by a mixture of oxygen and argon from cathodes of zinc-tin alloys of different compositions. The first zinc-tin mixed oxide with a thickness of about 15 nm is deposited from a metal target of an alloy of ZnSn with 90% Zn and 10% Sn (by weight). The second zinc-tin mixed oxide with a thickness of about 25 nm is deposited from a target of an alloy of ZnSn with 52% Zn and 48% Sn (by weight) to form the spinel structure of zinc stannate $Zn_2SnO_4$.

f) Then, a 4 nm final protective layer of TiN deposited from a metal target of Ti in a nitrogen atmosphere. As a variant, a 4 nm layer of TiZrOx can be deposited from a ceramic target as protective layer.

It should be noted that all the layers of ZnSnO$_x$ are sufficiently oxidised to be as transparent as possible. It should also be noted that the thicknesses of Ti, TiOx and TiN are given as equivalent thickness of TiO$_2$ (i.e. as a result of the oxidation of Ti, TiOx or TiN), which is their state in the finished product after thermal treatment, and is already the state even in the intermediate glazing that is suitable to undergo a thermal treatment with respect to Ti.

The coated glazing with the multilayer solar control lamination formed on the glass sheet then undergoes a thermal toughening operation, during which it is subjected to a temperature of 670° C. for 8 minutes and 30 seconds, then cooled abruptly by jets of cold air. During this thermal treatment, thin films of NiCr of the barrier layers oxidise sufficiently to be transparent, while forming an effective and stable shield to protect the silver layers. The upper protective layer of TiN itself oxidises to form TiO$_2$.

After this treatment, the coated and toughened glazing has the following properties:

$L_T$=46%; ∈(emissivity)=0.03; Rs=2.8 Ω/square; absorption=34%,
the tint in transmission is expressed by the following values:
L*=73.5; a*=−2; b*=−4; haze=0.10%;
the tint in reflection on the glass side is expressed by the following values:
$L_R$=25%; L*=58%; a*=−3; b*=−4.

This coated glazing is then assembled as double glazing with another 4 mm thick clear glass sheet, wherein the coating is arranged on the side of the internal space of the double glazing. The space between the two sheets is 15 mm and the air therein is replaced by 90% argon. When looking at the double glazing on the glass side of the coated glazing with lamination structure placed in position 2, i.e. when the glazing provided with the lamination is firstly viewed from the glass side, and then the clear glass sheet without a layer is viewed, the following properties are noted:

$L_T$=43%; $L_R$=27%; SF=27%; S=1.59 value U=1.1 W/(m$^2$·K);
the tint in transmission is expressed by the following values:
L*=71%; a*=−4; b*=+7
the tint in reflection is expressed by the following values:
L*=58%; a*=−3; b*=−4.

In the present invention, the following collective terms are used for the measured or calculated values. Light transmission ($L_T$), light reflection ($L_R$), light absorption ($L_A$) (percentage of light flux—of illuminant D65—absorbed by the glazing) and tint in transmission (1976 CIELAB L*a*b* values) are measured with illuminant D65/2°. With respect to the tint in reflection, the 1976 CIELAB values (L*a*b*) are measured with illuminant D65/10°. The solar factor (SF or g) is calculated in accordance with standard EN410. The value U (coefficient k) and emissivity (∈) are calculated in accordance with standards EN673 and ISO 10292.

Visual examination in reflection of the double glazing shows a uniform tint and appearance over the entire surface. The invention allows the formation of a double glazing with a low solar factor, which retains an adequate light transmission and has a very high aesthetic appeal.

Examples 2 to 11 and Comparative Example (C)

Unless otherwise indicated, the following Examples 2 to 11 are conducted in a similar manner to Example 1 above, but with different structures. Example 11 has a structure with three Ag layers. Example C is a comparative example that is not in accordance with the invention. The corresponding structures of the laminations are given in Table 1 below with the following explanation of the abbreviations used:

D1=the first dielectric coating formed from two or three oxide or nitride or possibly oxynitride layers. The nitride layers are deposited in a reactive mixture of nitrogen and argon from silicon-based or aluminium-based conductive targets. This applies to the other dielectrics of the lamination structure, where applicable. The Si$_3$N$_4$ or AlN layers used in the examples can be lightly oxidised in the form of SiOxNy or AlOxNy. It should be noted that the Si$_3$N$_4$ and ZnO layers can be doped with aluminium or other elements such as boron in the known manner.

D2 (and D3 in Example 11)=the intermediate dielectric coating formed, if present in the example, from oxide or nitride or possibly oxynitride layers like D1.

D3 (or D4 in Example 11)=the outer dielectric coating formed from one or two oxide or nitride or possibly oxynitride layers like D1.

IR1, IR2 and IR3=the first, second and third infrared reflecting functional layers.

P1, P2 and P3=the first, second and third sacrificial metal layers each formed from one or two layers of metal or metal alloy in metal or possibly sub-oxidised form. These layers are intended to protect the infrared reflecting material (IR1, IR2 and IR3), such as silver, from oxidation by oxidising in its place, in particular during deposition of the subsequent layers or during the thermal treatment of the layer, if this occurs. In the final product they would preferably be virtually fully oxidised. Table 1 shows the state of the layers when they leave the sputtering device before any thermal treatment, i.e. the sacrificial metal layers have already been oxidised by the plasma for deposition of the following layers, if such is the case. In this case, they are represented by their oxidised state and not in the form in which they have been deposited.

CS=upper protective layer, possibly formed from two layers.

In Table 1 the absorbent layer is represented in bold characters. The indexes represent the respective approximate atomic proportions of the metals without taking the oxygen or nitrogen in the layer into consideration. For example, Co$_{66}$Ti$_{34}$O of Example 2 indicates that there are about 66 atom % of Co and 34 atom % of Ti in relation to all the Co—Ti metals without considering oxygen, and so on for the other absorbent layers in the other examples.

ZSO5=zinc tin mixed oxide obtained by cathodic sputtering in an oxidising atmosphere from a metal target of an alloy of ZnSn with 52% Zn and 48% Sn;

ZSO9=zinc tin mixed oxide obtained by cathodic sputtering in an oxidising atmosphere from a metal target of an alloy of ZnSn with 90% Zn and 10% Sn;

TZO=TiZrYOx obtained from a ceramic target;

TNO=TiNbOx obtained from a ceramic target;

AZO=ZnAlOx, with 2 to 5% by weight of Al, obtained either from a metal target or from a ceramic target—in this latter case, AZO is underlined in the Table;

TXO=TiOx obtained from a ceramic target;

TiOx—TiOx obtained from a metal target;

In the Table the underlined oxides are oxides obtained from a ceramic target;

Ag$_{97}$Pd$_3$=represents a layer containing an alloy with 97 atom % Ag and 3 atom % Pd obtained from a metal target of the alloy. This layer can also be obtained by depositing two separate layers of Ag and Pd, wherein the alloy is formed by a diffusion of Pd into the Ag during the high-temperature thermal treatment operation.

TABLE 1

| Ex | D1 (nm) | IR1 (nm) | P1 (nm) | D2 (nm) | IR2 (nm) | P2 (nm) | D3 (nm) | CS (nm) |
|---|---|---|---|---|---|---|---|---|
| 2 | 44 ZSO5 | 10 ZSO9 | 9 Ag / 4 Ti | 15 $Co_{28}Cu_{72}O$ | — | — | — | 1.5 Ti |
| 3 | 7 ZSO5 / 20 $Co_{50}Zn_{50}O$ | 5 ZSO9 | 13 Ag | 10 ZSO9 / 70 ZSO5 | — | 15 Ag / 5 Ti | 10 ZSO9 / 15 ZSO5 | 3 TZO / 10 C |
| 4 | 33 AlN | 8 ZSO9 | 9 Ag / 12 AZO | 49 AlN / 27 $Co_{80}Cr_{20}O$ | 5 ZS09 / 20 Ag / 1 Pd | 8 AZO | 25 ZSO5 | 4 TNO / 3 C |
| 5 | 18 $Co_{74}Cr_{18}Ti_8ON$ | 17 ZSO9 | 18 Ag / 3 TXO | 40 SiAlN / 30 ZSO5 / 11 ZSO9 | 14 Ag | 5 TXO | 15 $Co_{67}Sn_{33}O$ / 12 ZSO5 | 3 TZO |
| 6 | 30 AlN | 6 AZO | 16 Ag / 6 TXO | 29 $Cu_{52}Al_{48}O$ / 37 ZSO5 / 12 AZO | 13 Ag | 6 TXO | 8 AZO / 23 SiN | — |
| 7 | 10 ZSO5 / 12 TZO | 11 ZSO9 | 9 Ag / 2 NiCrOx | 45 ZSO5 / 30 $Cu_{63}Zn_{37}O$ / 6 ZSO9 | 22 $Ag_{97}Pd_3$ | 2 NiCrOx | 12 ZSO9 / 14 ZSO5 | 3 TNO |
| 8 | 11 ZSO5 / 10 TNO | 8 AZO | 10 Ag / 4 TXO | 75 SiAlN / 11 AZO | 16 Ag | 21 $Ti_{50}Co_{50}Ox$ | 5 ZSO9 / 8 ZSO5 | 3 TZO |
| 9 | 20 ZSO5 | 17 ZSO9 | 10 Ag / 4 TXO | 10 ZSO9 / 70 ZSO5 / 8 ZSO9 | 16 Ag | 5 TXO | 15 $Cu_{50}Al_{50}O$ / 10 ZSO5 | 3 TZO |
| 10 | 25 SiN | 12 AZO | 22 Ag / 3 TZO | 26 $Cu_{50}Sn_{50}O$ / 24 ZSO5 | — | — | — | 4 $Si_{66}Zr_{33}N$ |
| C | 15 ZSO5 | 5 ZSO9 | 9 Ag / 3 TXO | 8 TiN / 8 ZS09 / 32 ZSO5 | — | — | — | 2 $SiO_2$ |

| Ex | D1 (nm) | IR1 (nm) | P1 (nm) | D2 (nm) | IR2 (nm) | P2 (nm) | D3 (nm) | IR3 (nm) | P3 (nm) | D4 (nm) | CS (nm) |
|---|---|---|---|---|---|---|---|---|---|---|---|
| 11 | 31 ZSO5 | 8 ZSO9 | 15 Ag | 5 TXO / 50 $Cu_{50}Al_{50}O$ / 20 ZSO9 | 15 Ag | 50 TXO | 70 ZSO5 / 8 ZSO9 | 15 Ag | 5 TXO | 8 ZSO9 / 23 ZSO5 | 3 TZO |

The coated glazing units of the laminations according to Examples 2 to 11 and C are then subjected to a thermal toughening, during which they were subjected to a temperature of 690° C. for 6 minutes, then abruptly cooled by jets of cold air. The optical and energy-related properties of the coated glazing units assembled as double glazing in the same manner as in Example 1 with a 4 mm clear glass sheet and a 15 mm space filled to 90% with argon, are given in Table 2. The glazing is observed with the lamination placed in position 2 on the outer sheet inside the double glazing, i.e. the glass bearing the coating is firstly viewed from the glass side and then the glass sheet without a layer is viewed. The number of the example followed by "nt" indicates that the given values relate to the non-toughened glazing or the glazing before toughening and "at" indicates after toughening.

The optical properties of Examples 5 to 11 vary very little following high-temperature thermal treatment. A toughened glazing according to these examples can therefore be placed side by side with a non-toughened glazing bearing the same lamination without an observer being able to perceive a difference in optical appearance. In fact, it can be seen in Table 2 that the variation in tint $\Delta E^*$ between the values obtained for non-toughened glazing units ("nt") and the values obtained for toughened glazing units ("at") is very slight and less than 2. The variation in tint during the thermal treatment is calculated on the basis of the formula $\Delta E^* = \sqrt{(\Delta L^*)^2 + (\Delta a^*)^2 + (\Delta b^*)^2}$, in which $\Delta L^*$, $\Delta a^*$ and $\Delta b^*$ are the differences in values $L^*$, $a^*$, $b^*$ between the toughened and non-toughened versions of the same structures. The value $\Delta E^*$ is preferably less than 3, advantageously less than 2, so

TABLE 2

| Ex. | $L_T$ (%) | $L_R$ (%) | $A_L$ (%) | SF (%) | U(k) (W/m²K) | $L_T^*$ | $a_T^*$ | $b_T^*$ | $L_{RV}^*$ | $a_{RV}^*$ | $b_{RV}^*$ |
|---|---|---|---|---|---|---|---|---|---|---|---|
| 2 | 51 | 12 | 37 | 44 | 1.4 | 77 | −2 | −1 | 42 | −1 | −1 |
| 3 | 58 | 11 | 31 | 34 | 1.1 | 81 | −5 | 7 | 40 | 0 | −15 |
| 4 | 49 | 20 | 31 | 31 | 1.1 | 76 | −2 | 1 | 52 | −1 | −9 |
| 5nt | 39 | 15 | 46 | 22 | 1.1 | 69 | −6 | 4 | 46 | −2 | −8 |
| 5at | 39 | 16 | 45 | 22 | 1.1 | 69 | −7 | 4 | 47 | −3 | −7 |
| 6nt | 59 | 13 | 28 | 32 | 1.1 | 81 | −5 | 2 | 43 | −2 | −9 |
| 6at | 60 | 13 | 27 | 33 | 1.1 | 82 | −5 | 3 | 43 | −1 | −9 |
| 7nt | 39 | 16 | 45 | 24 | 1.1 | 69 | −3 | 0 | 48 | −4 | −9 |
| 7at | 39 | 17 | 44 | 25 | 1.1 | 69 | −2 | 0 | 49 | −3 | −8 |
| 8nt | 62 | 14 | 24 | 34 | 1.1 | 83 | −5 | 3 | 45 | −2 | −9 |
| 8at | 62 | 15 | 23 | 34 | 1.1 | 83 | −5 | 4 | 45 | −2 | −10 |
| 9nt | 62 | 15 | 23 | 36 | 1.1 | 83 | −4 | 3 | 46 | −3 | −9 |
| 9at | 61 | 15 | 24 | 35 | 1.1 | 81 | −5 | 3 | 45 | −3 | −8 |
| 10nt | 41 | 27 | 32 | 26 | 1.1 | 70 | −3 | 3 | 58 | −1 | −6 |
| 10at | 40 | 28 | 32 | 26 | 1.1 | 69 | −3 | 4 | 59 | −1 | −7 |
| 11nt | 40 | 17 | 43 | 23 | 1.1 | 69 | −7 | −2 | 48 | −5 | −4 |
| 11at | 42 | 18 | 40 | 23 | 1.1 | 71 | −6 | −2 | 49 | −4 | −4 |
| C nt | 59 | 21 | 20 | 44 | 1.3 | 81 | −17 | +6 | 54 | −4 | −13 |
| C at | 72 | 20 | 8 | 57 | 1.3 | 88 | 0 | +5 | 52 | −7 | −15 |

$L_T^*$, $a_T^*$, $b_T^*$ represent the 1976 CIELAB values of the tint in transmission measured with respect to illuminant D65/2°.
$L_{RV}^*$, $a_{RV}^*$, $b_{RV}^*$ represent the 1976 CIELAB values of the tint in reflection on the glass side measured with respect to illuminant D65/10°.

that an observer does not perceive a difference in optical appearance. For Examples 5 to 11 of Table 2, the value of ΔE* does not reach 2 (square root of 3 for Examples 5 and 7). This can be compared to the value ΔE* of 4 for the comparative example C.

The aesthetic appearance of all these examples is excellent and uniform over the entire surface. It is seen that as a result of the invention a relatively low solar factor can be easily obtained, while retaining a high selectivity and an appealing aesthetic appearance that meets market demand. The selectivity of the examples is higher than 1.1 and even higher than 1.5 for the majority of examples. It is higher than 1.7 for many of them and even higher than 1.8 for some. The tint in reflection on the glass side is neutral to bluish, while avoiding red or purple tints that are of little appeal. It is also noted that the level of total energy absorption, partly due to the composition of the cobalt- and/or copper-based alloy according to the invention, is largely retained after thermal treatment.

In Example 7 the Ag—Pd alloy of the second functional layer (IR2) reinforces the effect of the absorbent layer by slightly increasing the absorption of the lamination.

The characteristics of the comparative example show that the TiN absorbent layer has oxidised to $TiO_2$ during the thermal treatment and has therefore lost its absorption characteristics. In contrast, CuAlO, for example, is practically insensitive to oxidation during the thermal treatment and therefore retains its absorbent properties. On the other hand, TiN sandwiched between 2 oxides requires a change in the deposition atmosphere, which is not the case with CuAlO, for example.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A sheet of vitreous material bearing a multilayer solar control lamination, said lamination comprising:
   a functional layer;
   a dielectric coating below the functional layer;
   a dielectric coating above the functional layer; and
   an absorbent layer,
   wherein the functional layer comprises a material that reflects infrared radiation,
   wherein the absorbent layer has a thickness of at least 4 nm,
   wherein the absorbent layer comprises at least one oxide or oxynitride of an alloy comprising at least 20 atom % cobalt and/or copper, and
   wherein the alloy comprises cobalt-tin, cobalt-titanium, copper-aluminium, cobalt-chromium, copper-zinc, copper-tin, copper-cobalt, copper-titanium, cobalt-copper, or mixtures thereof.

2. The sheet of vitreous material according to claim 1, wherein when the multilayer solar control lamination is deposited onto a clear soda-lime float glass sheet 6 mm thick, the solar factor SF of the coated sheet is less than 45% and the light transmission $L_T$ is less than 70%.

3. The sheet of vitreous material according to claim 1, wherein the alloy comprises at least 40 atom % of cobalt or copper.

4. The sheet of vitreous material according to claim 1, wherein the absorbent layer comprises one or more of the following oxides: CuAlOx, CuZnOx, CoSnOx, CoTiOx, CuTiOx and CuSnOx.

5. The sheet of vitreous material according to claim 1, wherein the absorbent layer comprises one or more of the following oxides: CoCuOx, CoCrOx and CoCrTiOx.

6. The sheet of vitreous material according to claim 1, wherein the absorbent layer has a thickness of 10 to 80 nm.

7. The sheet of vitreous material according to claim 1, wherein the functional layer is silver-based.

8. The sheet of vitreous material according to claim 1, wherein the multilayer solar control lamination comprises at least two silver-based functional layers.

9. The sheet of vitreous material according to claim 1, wherein the sheet of vitreous material bearing a multilayer solar control lamination has undergone a toughening and/or bending high-temperature thermal treatment.

10. The sheet of vitreous material according to claim 1, wherein at least one dielectric coating is a zinc-tin mixed oxide-based layer containing at least 20% tin.

11. The sheet of vitreous material according to claim 1, wherein a lower dielectric coating arranged between the sheet of vitreous material and the functional layer is a zinc-tin mixed oxide layer containing at least 20% tin, and an outermost dielectric coating is also a zinc-tin mixed oxide layer containing at least 20% tin.

12. The sheet of vitreous material according to claim 1, wherein the dielectric coating below the functional layer comprises a zinc oxide-based layer, optionally doped with aluminium, said zinc oxide-based layer being in direct contact with the functional layer.

13. The sheet of vitreous material according to claim 1, wherein the dielectric coating below the functional layer comprises a zinc-tin mixed oxide-based layer that does not contain more than about 20% tin and which comprises at least about 80% zinc, said zinc-tin mixed oxide-based layer being in direct contact with the functional layer.

14. The sheet of vitreous material according to claim 1, wherein the dielectric coating below the functional layer comprises a zinc-tin mixed oxide-based layer that does not comprise more than about 10% tin and comprises at least about 90% zinc, said zinc-tin mixed oxide-based layer being in direct contact with the functional layer.

15. The sheet of vitreous material according to claim 1, wherein values a* and b* in reflection on the vitreous material side are such that $-5<a^*<0$ and $-15<b^*<0$.

16. The sheet of vitreous material according to claim 1, wherein the absorbent layer is obtained by cathodic sputtering of a ceramic target formed from the corresponding mixed oxide.

17. The sheet of vitreous material according to claim 1, wherein after a high-temperature thermal treatment the sheet of vitreous material bearing a multilayer solar control lamination has a variation in tint ΔE* not exceeding the value of 2.

18. The sheet of vitreous material according to claim 1, wherein the lamination comprises three functional layers, all located between dielectric coatings and comprising a material that reflects infrared radiation.

19. The sheet of vitreous material according to claim 1, wherein the sheet of vitreous material bearing a multilayer solar control lamination has a selectivity higher than 1.5.

20. A multiple glazing comprising at least one sheet of vitreous material according to claim 1.

21. The multiple glazing according to claim 20, wherein the sheet of vitreous material bearing a multilayer solar control lamination has a solar factor equal to or less than 35% and a light reflection less than 18%.

22. The multiple glazing according to claim 20, wherein the sheet of vitreous material bearing a multilayer solar control lamination has a solar factor equal to or less than 28%.

23. The multiple glazing according to claim 20, wherein the sheet of vitreous material bearing a multilayer solar control lamination has a light transmission less than 55%.

* * * * *